United States Patent [19]

Bouhours et al.

[11] Patent Number: 4,869,478
[45] Date of Patent: Sep. 26, 1989

[54] IMPROVEMENTS TO HYDRAULIC ANTIVIBRATORY SUPPORTS

[75] Inventors: Jean P. Bouhours, Arrou; Alain Bellamy, Vendome, both of France

[73] Assignee: Hutchinson, France

[21] Appl. No.: 147,932

[22] Filed: Jan. 25, 1988

[30] Foreign Application Priority Data

Jan. 26, 1987 [FR] France .................................. 8700859

[51] Int. Cl.$^4$ .............................................. F16F 9/34
[52] U.S. Cl. .................... 267/140.1; 180/312; 188/299; 248/562; 248/636; 251/304
[58] Field of Search ...................... 267/140.1; 188/299; 248/562, 636, 638; 180/312; 280/714; 251/304

[56] References Cited

U.S. PATENT DOCUMENTS

| 192,622 | 7/1877 | Guild et al. ......................... 251/304 |
| 2,421,585 | 6/1947 | Thiry ................................. 267/140.1 |
| 4,313,529 | 2/1982 | Kato et al. .......................... 188/299 |
| 4,554,948 | 11/1985 | Bergmann ....................... 251/304 X |
| 4,583,503 | 4/1986 | Kumagai et al. ................ 180/312 X |
| 4,641,808 | 2/1987 | Flower ......................... 267/140.1 X |
| 4,645,042 | 2/1987 | Inoue et al. ..................... 188/299 X |
| 4,681,306 | 7/1987 | Hofmann et al. ................ 267/140.1 |
| 4,700,933 | 10/1987 | Chikamori et al. .............. 267/140.1 |
| 4,709,779 | 12/1987 | Takehara .................... 267/140.1 X |
| 4,724,936 | 2/1988 | Koga et al. .................. 267/140.1 X |

FOREIGN PATENT DOCUMENTS

| 216082 | 4/1987 | European Pat. Off. ......... 267/140.1 |
| 65635 | 4/1984 | Japan ............................... 267/140.1 |
| 292940 | 12/1987 | Japan .................................. 248/562 |

Primary Examiner—George E. A. Halvosa
Attorney, Agent, or Firm—Larson & Taylor

[57] ABSTRACT

In a hydraulic antivibratory support for insertion between two rigid elements (1 and 3), and comprising a work chamber (A) and a compensation chamber (B) separated by a dividing wall (6) and joined together by a restricted passage, this restricted passage, defined at both ends by two fixed orifices (31, 32) opening respectively into the two chambers (A and B) is defined over at least a portion of its lateral periphery by a flat or cylindrical face (25) of a rigid rotary valve (26) housed jointly between the two orifices and connected angularly to the rotor of a small electric motor (19).

6 Claims, 1 Drawing Sheet

U.S. Patent   Sep. 26, 1989   4,869,478
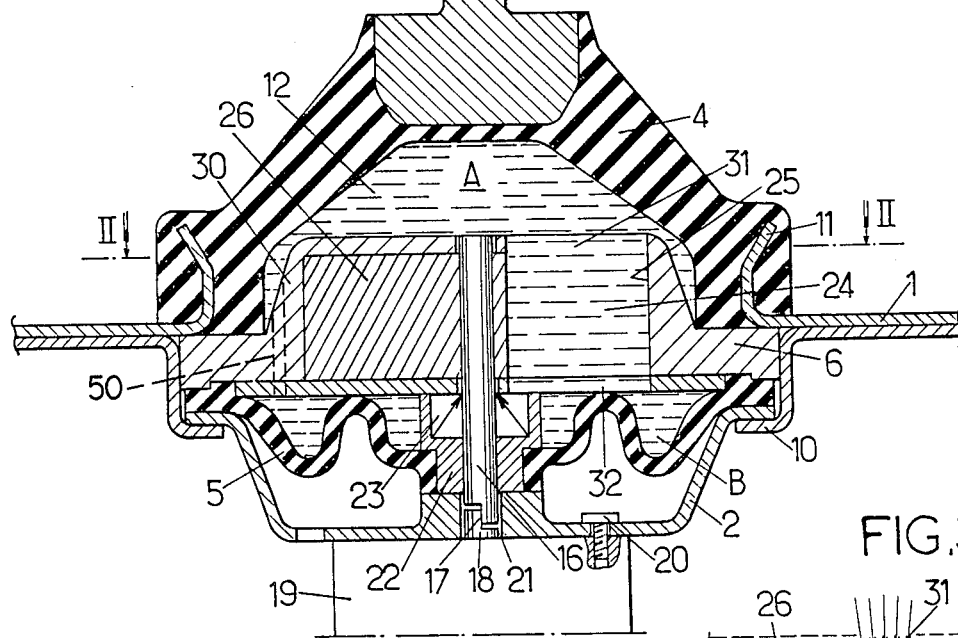
FIG.1.
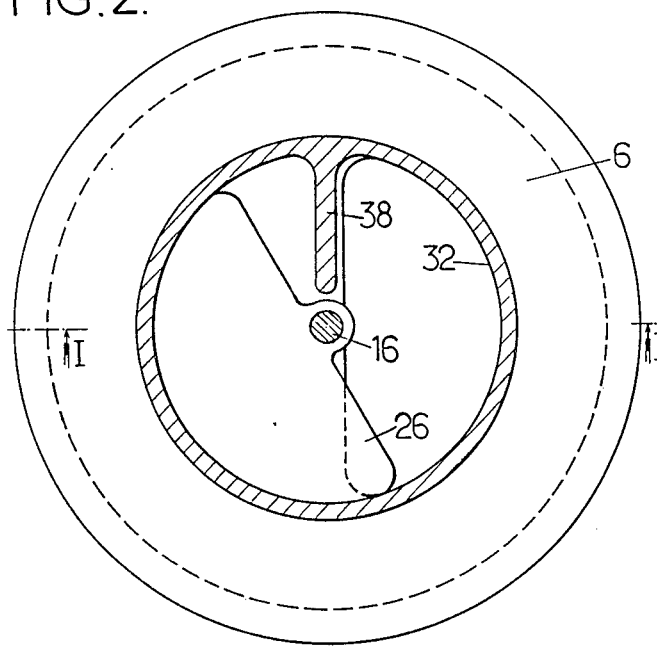
FIG.2.
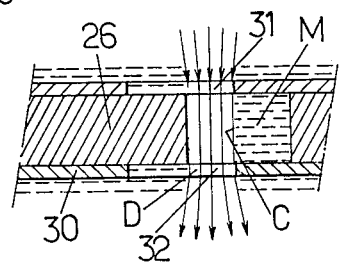
FIG.3.
FIG.4.

IMPROVEMENTS TO HYDRAULIC ANTIVIBRATORY SUPPORTS

The invention relates to antivibratory supports for insertion, for support and shock absorbing purposes, between two rigid elements individually subjected to certain oscillations or vibrations, the shock absorbing causing, at least under certain operating conditions, a liquid to be driven through a restricted passage.

By way of non limitative example, such supports may be mounted between a vehicle chassis and the internal combustion engine of this vehicle for absorbing not only the oscillations imposed on the chassis by the unevenesses of the ground when the vehicle is travelling over this ground but also the vibrations due to the operation of the engine.

Among the supports of the kind in question the invention relates more particularly to those formed by a sealed case inserted between the two rigid elements, which case has a rigid base securable to one of the two rigid elements, a rigid ring securable to the other rigid element, a resilient annular support wall, preferably of a truncated cone shape, sealingly connecting the base to the ring and a flexible membrane sealingly joined to the ring, the inside of this case being divided, by a rigid sealed dividing wall connected to the ring between the annular wall and the membrane, into two chambers, namely a work chamber on the annular wall side and a compensation chamber on the membrane side, these two chambers communicating together permanently through the above restricted passage, and a liquid mass filling the two chambers as well as the restricted passage.

With such a support, the oscillations or vibrations created between the two rigid elements cause these two elements to be moved axially in turn to and away from each other.

These oscillations result in driving the liquid from one of the two chambers into the other through the restricted passage and conversely and, for a give value $F_O$ of the frequency at which such driving alternates, which value depends essentially on the dimensions of said passage, a resonance of the liquid mass or "column" flowing in this passage can be observed, which causes a reduction of the transfers at this frequency while reducing the corresponding acoustic intensity.

The invention relates more particularly still to the case where the supports of the kind in question include means for adjusting the cross-section of said passage, and so the value $F_O$.

A number of approaches have already been proposed for providing such adjustment, but they generally use complicate means or means which are liable to easily get out of adjustment, or which act only on the cross-section of a relatively short column, which makes the adjustments difficult and limited.

The invention ensures the desired adjustments over relatively large column lengths with simple and robust means.

For this, the supports of the kind in question in accordance with the invention are essentially characterized in that their restricted passage, defined at both ends by two fixed orifices opening respectively into the two chambers is, for at least the maximum degree of opening of said passage, defined over at least a portion of its lateral periphery by a flat or cylindrical face of a rigid rotary valve housed jointingly between the two orifices and connected angularly to the rotor of a drive member such as a small electric motor.

In advantageous embodiments, recourse is further had to one and/or other of the following arrangements:
- the two orifices are identical and disposed facing each other and, for the maximum open position of the restricted passage, the valve defines an at least partial cylindrical channel joining these two orifices together in the direction of alignment,
- in a support according to the preceding paragraph, the axis of rotation of the valve is parallel to the direction of alignment of the two orifices and off-center with respect thereto,
- in a support according to the preceding paragraph, the valve is in the form of a relatively axially thick and flat sector, centered on the axis of rotation of the valve and housed in a cylindrical case which surrounds it jointingly,
- in a support according to the preceding paragraph, the angular extent of the sector is of the order of 180°,
- in a support according to any one of the three preceding paragraphs the cylindrical case includes a radial dividing wall forming an angular end of travel stop for the valve,
- the axis of rotation of the valve is perpendicular to the direction of alignment of the two orifices, this valve being in the form of a rotary plug of a plug valve.

Apart from these main arrangements, the invention comprises other arrangements which are preferably used at the same time and which will be more explicitly discussed hereafter.

In the following discussion two preferred embodiments of the invention will be described with reference to the accompanying drawings in a way of which is of course in no wise limitative.

FIG. 1, of these drawings, shows in axial section through I—I of FIG. 1, an antivibratory support constructed in accordance with the invention FIG. 2 shows in cross section through II—II of FIG. 1 the central parts of this support, FIG. 3 is an explanatory diagram relative to said support, and FIG. 4 shows schematically a portion of another antivibratory support also in accordance with the invention.

In each case, the support considered is intended to be inserted vertically or in a direction slightly tilted from the vertical between a rigid support member formed by a vehicle chassis and a rigid support member formed by an internal combustion engine.

The terms "top, bottom, upper, lower, cup", are used solely in the following description by way of non limitative example for the support described may be perfectly well used in the reverse direction to that adopted for this description.

The support shown in FIG. 1 is in the general form of a sealed case of revolution about an axis x comprising:
- an annular plate or rigid ring 1 extending the edge of a lower metal cup 2 horizontally outwardly, which ring may be secured to the chassis of a vehicle using bolt-nut systems not shown,
- an upper stud bolt 3 whose threaded shank, extending upwardly, serves for fixing the engine of the vehicle,
- a resilient annular wall 4 sufficiently thick for transmitting the loads of the engine to the chassis, which wall is substantially defined by two surfaces in the form of truncated cones widening out downwardly and whose small base, disposed at the top, is adhered to the head of stud 3, its lower large base being sealingly joined to ring 1, and a lower flexible and sealing membrane 5 contained inside cup 2, the edge of this membrane being sealingly fixed to ring 1.

An intermediate metal dividing wall 6 divides the inside of the case into two chambers, namely an upper work chamber A and a lower compensation or balances chamber B.

The periphery of dividing wall 6 is sealingly connected for this purpose to ring 1, between the thick wall 4 and membrane 5.

Ring 1 is here formed by two pieces of annular metal sheet joined together and the assembly on this ring 1 of the respective edges of cup 2, of membrane 5 and of intermediate dividing wall 6 is provided by superimposing these three edges and by nipping or crimping same inside the edge 10 of one of the metal sheet pieces closed thereover, the edge 11 of the other piece being bent upwardly so as to form a reinforcement for the thick wall 4.

Dividing wall 6 has passing therethrough a restricted passage joining the two chambers A and B together and the whole of this passage and these chambers is filled with a liquid 12.

In the embodiment shown in FIGS. 1 to 3 the restricted passage is a partial cylindrical channel 24 with its axis parallel to axis X and off-center with respect thereto.

Said channel 24 extends axially inside a cylindrical case 30, with axis X, fixed to the dividing wall 6, from a first orifice 31 formed in this case and opening into chamber A to a second orifice 32 also formed in the case and opening into chamber B.

Channel 24 is defined laterally on the one hand by a portion of the internal cylindrical face 25 of the case 30, a face of revolution about axis X and, on the other hand, by the flat side edge of a flat and thick vane 26 fixed to a shaft 16 mounted for rotation in the case about axis X.

Vane 26 has the general shape of a circular sector with axis X whose angular extent is preferably of the order of 180° and whose radius is substantially equal to that of face 25.

The form of each of the orifices 31 and 32 is substantially identical to that of vane 26: the cross-section of the restricted passage formed between these two orifices may then vary from a maximum value for which the space between the two orifices is totally opened by the vane to a minimum, even zero, value for which the vane occupies said space substantially completely or completely.

The axial thickness L of the vane, which corresponds to the length of the restricted passage between the two chambers A and B, is relatively large: this thickness L is generally greater than or equal to 10mm and, if the cross-section of each orifice 31 and 32 is equal to S, the value of the thickness L is generally greater than $0.3 \sqrt{S}$ and preferably $0.5 \sqrt{S}$.

Shaft 16 is coupled at 17 to the output shaft 18 of an electric motor 19.

This motor 19 is disposed inside the support, being fixed by screwing screw 20 below the cup 2.

The assembly of the two mutually coupled rotary shafts 16 and 18 pass jointingly through a hole 21 in the cup and a guide bearing 22 fixed to the bottom of this cup, thereinside.

Sealing between said assembly and the bearing 22 is provided by a seal 23.

The center of the flexible membrane 5 has passing therethrough the bearing 22 and is sealingly adhered thereto.

The operation of the above described support is the following.

When vane 26 is in its angular position in which it closes orifices 31 and 32, communication between the two chambers A and B is interrupted and the support is relatively firm.

When, on the contrary, it is desired to damp out certain vibrations, it is sufficient to rotate vane 26 by means of the electric motor 19 so that this vane opens orifices 31 and 32 at least partially.

The amount by which these orifices are opened is adjusted as a function of the frequency $F_O$ of the vibrations whose transfer it is desired to minimize.

In fact, this amount defines the cross section of the liquid "column" likely to move and so to resonate inside the restricted passage.

This column C may be considered in a first approximation (see FIG. 3), as the liquid volume contained in the cylinder whose generatrices are parallel to axis X and whose directrices are the two restricted openings D opened by vane 26 at the level of the two orifices 31 and 32.

As a first approximation, it may be considered that the liquid mass M which, inside case 30, is adjacent said column C is immobile, this mass being imprisoned axially between two rigid transverse portions of the case.

It should be noted that, under these conditions, the length L of column C of adjustable section is relatively large with respect to its cross section S.

Exactly the same principle governs the variant shown schematically in FIG. 4.

In this FIG. 4, the restricted passage with adjustable aperture formed in dividing wall 6 is in the form of a plug valve 33.

This valve is further formed with two orifices 34 and 35 opening respectively into the two chambers A and B and its plug 36 is mounted for rotation about an axis perpendicular to the direction of alignment of the two orifices and is formed with a cylindrical channel 37 extending radially with respect to said axis.

Here the plug 36 is rotated by the electric motor.

Again in this variant the cylindrical column C extends between the two restricted openings formed respectively between the axial ends of channel 37 and the two orifices 34 and 35.

In a variant of the first version described above, which may be advantageous in certain cases, case 30 may comprise a flat radial dividing wall 38 which forms an angular end of travel stop for vane 26.

The presence of this dividing wall 38 forms the face which, with the vane and face 25, defines column C inside the case.

Whatever the embodiment adopted, an antivibratory support is thus obtained whose construction, operation and advantages particularly the possibility that it offers of providing a "column" of large relatively length and of adjustable section over the whole of its length-follows sufficiently from what has gone before.

As is evident, and as it follows moreover from the preceding discussion, the invention is in no wise limited to those of its modes of application and embodiments which have been more especially considered; it embraces, on the contrary, all variants thereof, particularly:

- those in which a portion of the work chamber A is defined in a way known per se by a mobile or deformable dividing wall movable or deformable perpendicularly to itself with an amplitude limited to a low value, particularly of the order of 0.5mm, so as to damp out certain vibrations of low amplitude and relatively high frequency,
- and those where at least another restricted passage of constant cross-section, as shown at dotted lines 50 in FIG. 1, is provided in parallel with the above ajdustable restricted passage, between the two chambers A and B, which would confer on the support permanent shock absorbing or filtering properties for some oscillations or vibrations of predetermined frequency.

We claim:

1. An antivibratory device for insertion for support and shock absorbing purposes between two rigid elements, comprised by a sealed case having a rigid base which may be fixed to one of the two rigid elements, a rigid ring securable to the other rigid element, a resilient annular support wall sealingly connecting the base to the ring and a flexible membrane sealingly joined to the ring, the inside of this case being divided, by a rigid sealed dividing wall connected to the ring between the annular wall and the membrane, into two chambers, namely a work chamber on the annular wall side and a compensation chamber on the membrane side, these two chambers communicating together through a restricted passage with an adjustable aperture, and a liquid mass filling the two chambers as well as the restricted passage, the restricted passage defined at both ends by two fixed orifices opening respectively into the two chambers, for at least the maximum degree of opening of said passage, said passage being defined over at least a portion of its lateral periphery by a face of a rigid rotary valve housed between the two orifices and connected angularly to the rotor of a drive member for rotation about an axis to vary the cross-section of the passage, said valve being in the form of a relatively axially, thick, flat sector centered on the axis of rotation of the valve and housed in a cylindrical case which surrounds the valve and is of an inside shape which mates with the lateral outer periphery of the valve, the thickness of the valve, taken in the direction of alignment of the two orifices being equal to at least 10 mm, and wherein if "S" is the maximum opening cross-section of the restricted passage, the ratio between the thickness of the valve, taken in the direction of alignment of the two orifices and $\sqrt{S}$ is at least equal to 0.3.

2. Support according to claim 1, characterized in that the two orifices (31, 32; 34; 35) are identical and disposed facing each other and, for the maximum open position of the restricted passage, the valve defines at least partially cylindrical channel joining these two orifices together in the direction of alignment, 3. Support according to claim 2, characterized in that the axis of rotation (X) of the valve is parallel to the direction of alignment of the two orifices (31, 32) and off-centered with respect thereto.

4. Support according to claim 1, characterized in that the angular extent of the sector is of the order of 180°.

5. Support according to claim 1, characterized in that the cylindrical case (30) includes a radial dividing wall (38) forming an angular end of travel stop for the valve (26).

6. Support according to claim 1, characterized in that at least another restricted passage of invariable section is provided parallel to the adjustable restricted passage, between the two chambers (A and B).

* * * * *